March 29, 1966      E. W. SPARKS      3,243,006
ROUGH TERRAIN SCOOTER HAVING A PLURALITY OF DRIVEN WHEELS
Filed June 22, 1964      2 Sheets-Sheet 1
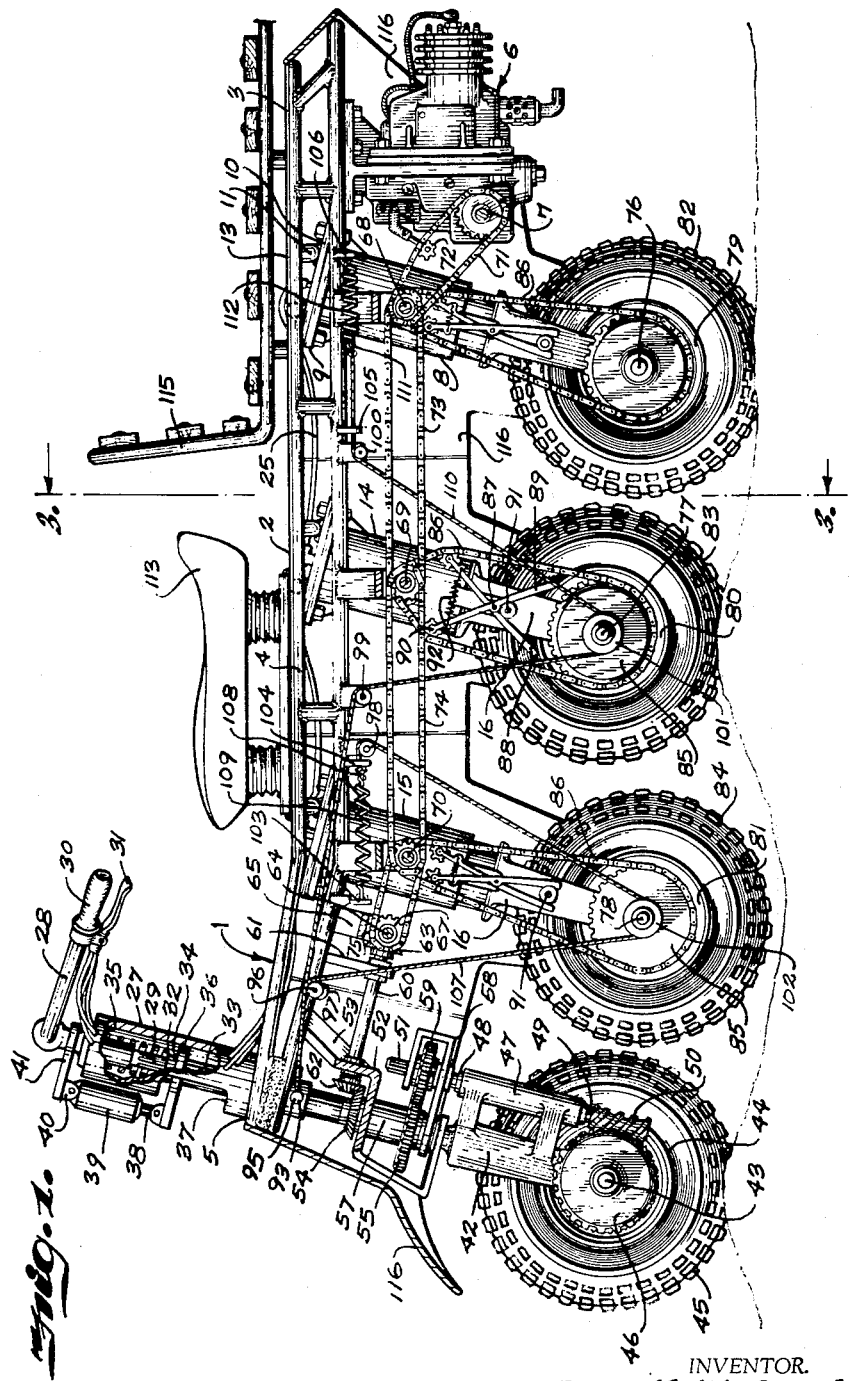
INVENTOR.
Everett W. Sparks
BY
Fishburn & Gold
ATTORNEYS

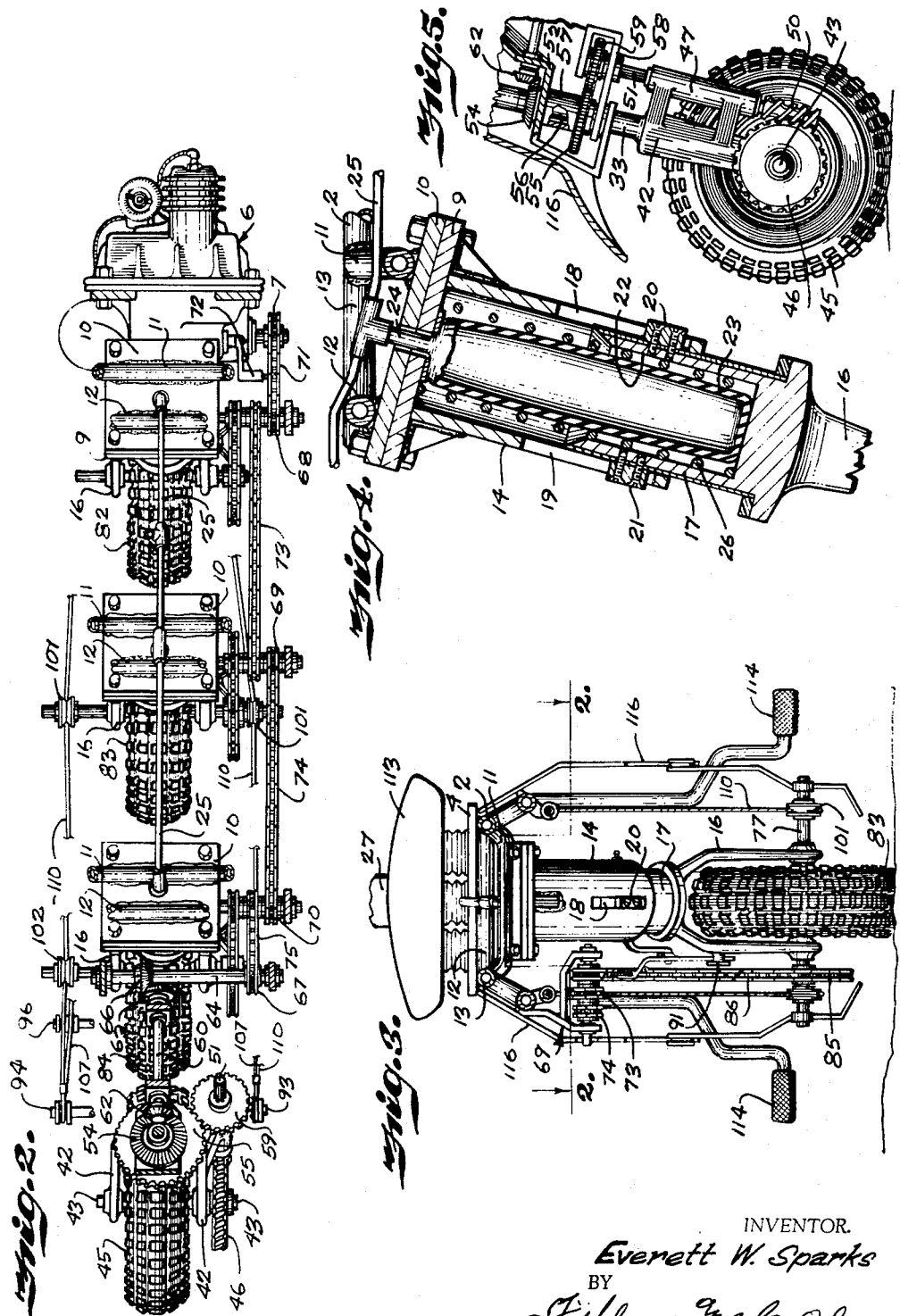

United States Patent Office 3,243,006
Patented Mar. 29, 1966

3,243,006
ROUGH TERRAIN SCOOTER HAVING A PLURALITY OF DRIVEN WHEELS
Everett W. Sparks, 316 Osage, Leavenworth, Kans.
Filed June 22, 1964, Ser. No. 376,822
6 Claims. (Cl. 180—21)

This invention relates to vehicles adapted for travel over rough terrain, and more particularly to a balance-type scooter having more than two driven wheels.

Known balance-type vehicles are generally unsuitable for use in rough terrain primarily because of inability to climb over obstacles such as logs or large stones. It has been proposed to drive both the front and rear wheels of such vehicles to increase traction, however, in many instances, the vehicle is still unable to climb over obstacles and may tend to "hang up" with the obstacle trapped between the wheels. It has also been proposed to use on such vehicles an elongated traction belt with a substantial portion in contact with the ground to increase total traction; however, such vehicles have very limited maneuverability.

The principal objects of the present invention are: To provide a balance vehicle having more than two wheels, all of which are driven; to provide such a vehicle which is easily maneuverable by lifting the intermediate wheel or wheels during turning of the vehicle; to provide such a device wherein all of the wheels are substantially independently suspended and are easily displaced large distances for rapid traverse of rough terrain; to provide such a vehicle wherein selected wheels cooperate to maintain maximum ground contact therebetween to aid in climbing over obstacles of substantial size without "hanging up;" and to provide such a vehicle which is easily controlled, rugged and well adapted for its intended purpose.

Other objects and advantages of this invention will become apparent from the following description taken in connection with the accompanying drawings wherein are set forth by way of illustration and example certain embodiments of this invention.

FIG. 1 is a side elevational view of a vehicle embodying this invention adapted for travel over rough terrain, a portion of the body or fenders being broken away to show the structure therebeneath.

FIG. 2 is a cross-sectional fragmentary top plan view taken on the line 2—2, FIG. 3, particularly showing the driving connections between the wheels.

FIG. 3 is a fragmentary end elevation taken on the line 3—3, FIG. 1, particularly showing the suspension structure for a non-steering wheel.

FIG. 4 is a vertical cross-sectional fragmentary view on an enlarged scale showing the interior construction of a non-steering wheel suspension structure.

FIG. 5 is a fragmentary view in side elevation showing the front or steering wheel in downwardly extended position.

Referring to the drawings in more detail:

The reference numeral 1 generally indicates a scooter type vehicle embodying this invention which is well adapted for travel over rough terrain. The vehicle 1 includes an elongated horizontally extending tubular frame 2 having a rear portion 3, an intermediate portion 4 and a forward portion 5. An internal combustion engine 6 is secured to the frame, in the illustrated example at the rear portion 3, and has an output drive chain sprocket 7.

A first or rear forwardly and downwardly inclined cylindrical sleeve 8 is fixed to the frame 2 at the rear portion 3 by means of a suitable mounting plate 9 bolted to a frame mounting plate 10. The frame mounting plate 10 is rigidly secured to the frame 2 by welding two tubular cross members 11 and 12 which are in turn welded to longitudinal frame members 13. Second and third or intermediate spaced apart forwardly and downwardly inclined cylindrical sleeves 14 and 15 are secured to the frame 2 in the manner of the sleeve 8 at the intermediate portion 4, the second and third sleeves 14 and 15 being aligned longitudinally of the frame with the first or rear sleeve 8.

A fork member 16 is provided for each of the sleeves 8, 14 and 15. Each fork member 16 has an upper cylindrical hollow extension 17 telescopically received into the respective sleeve. Upwardly extending elongated slots 18 and 19 are located in each of the sleeves 8, 14 and 15 and receive respective key members 20 and 21 fixed to the extensions 17 and slidably engaging in the slots 18 and 19 to maintain the fork members 16 rotatably fixed with respect to the frame 2. The extensions 17 and sleeves 8, 14 and 15 form elongated enclosed chambers 22 therebetween which are variable in longitudinal dimension depending upon the relative telescopic positions of the respective extensions 17 within the sleeves. A resilient balloon member or bag 23, preferably constructed of a resilient material such as rubber, is located in each of the chambers 22 and forms a complete enclosure except for a nipple 24 communicating therewith and extending upwardly through the plates 9 and 10 covering the upper end of the sleeves 8, 14 and 15. The nipple 24 communicates with a tube 25 extending longitudinally of the frame 2. The tube 25 joins the nipples extending from the sleeves 8, 14 and 15 whereby the respective bags 23 communicate with each other.

Helical compression springs 26 are located in the respective chambers 22 and surround the bags 21. The compression springs 26 and the fluid, such as air, contained in the bags 23 normally resiliently urge the fork members 16 downwardly with respect to the frame 2. As noted below, however, the downward force exerted by the respective bags 23 varies in accordance with the degree of compression of the adjacent bags. Thus, an extension or compression of one bag will tend to produce an opposite reaction on the remaining bags to vary the suspension force on the respective suspension structures.

An upwardly and rearwardly inclined elongated housing 27 is fixed to the frame 2 at the frame forward portion 5. A handlebar steering member 28 is pivotally mounted on the upper end of the housing 27 and has a splined stud shaft 29 extending downwardly thereinto. The handlebar steering member 28 terminates at the lateral ends thereof in handle grips 30 associated with suitable engine and braking controls 31 of a suitable type in common use. A helical compression spring 32 is located within the housing 27 and surrounding the stud shaft 29. A downwardly and forwardly inclined steering shaft 33 has a spline receiving upper portion 34 located within the housing 27 and slidably telescopically receiving the stud shaft 29 for permitting relative axial movement therebetween but preventing relative rotational movement therebetween. The compression spring 32 bears at opposite ends thereof respectively against the housing at 35 and a collar 36 fixed to the steering shaft to urge the steering shaft resiliently downwardly with respect to the frame forward portion 5. The collar 36 extends forwardly through a suitable cut-away portion 37 in the housing 27 for mounting one end 38 of a siutable shock absorber 39, the other end of which is mounted on a collar 41 axially fixed with respect to the steering member 28 and housing 27.

The steering shaft 33 is journalled to the frame forward portion 5 and has a forked lower end 42 spaced downwardly and forwardly of the frame forward end. A horizontally, transversely extending wheel axle 43 is journalled in the forked lower end 42 and supports a front wheel hub 44 with a front low pressure tire 45 mounted thereon. A worm gear 46 is fixed to the wheel axle 43 for rotation with the front tire 45. A support member 47 is fixed to the steering shaft 33 adjacent the front wheel hub 44 and supports a shaft bearing sleeve 48 extending parallel to and spaced from the steering shaft. A downwardly extending shaft 49 is journalled in the bearing sleeve 48 and terminates at the lower end thereof in a worm 50 engaging the worm gear 46 and at the upper end thereof in an elongated spline portion 51.

A support bracket 52 is fixed by means of an arm 53 rigidly to the frame forward portion 5 and rotatably supports a bevel gear 54 and a spur gear 55 rotatably fixed with respect to each other on an interior sleeve 56 (FIG. 5), the spur gear 55 being rotatably mounted with respect to an exterior sleeve 57 forming a part of the support bracket 52. An arm 58 is pivotally supported by the bracket 52 and rotates with the shaft 33, however, the shaft 33 may move longitudinally therethrough. The arm 58 extends rearwardly of the spur gear 55. The arm 58 rotatably supports a spur gear 59 in meshing relationship with the gear 55 and axially fixed with respect thereto. The spur gear 59 has a splined bore axially slidably receiving the downwardly extending shaft spline portion 51. The steering shaft 33 is slidable longitudinally of and rotatable within the interior sleeve 56 whereby the forked lower end 42 may move downwardly with respect to the frame 2, as best illustrated in FIG. 5, while permitting steering by means of the handlebar member 28. When the forked lower end 42 moves longitudinally with respect to the interior sleeve 56, the support member 47 moves therewith which causes the spline portion 51 to slide axially with respect to the spur gear 59 but retain the driving connection therebetween for rotating the front tire 45 through the worm 50 and worm gear 46.

A longitudinal drive shaft 60 is journalled to the frame 2 by means of the arm 53 and a rear arm 61 and has bevel gears 62 and 63 fixed respectively to opposite ends thereof. The bevel gear 62 meshes with the support bracket bevel gear 54 for rotation therewith. A transverse drive shaft 64 is journalled to the frame 2 by means of a suitable bracket 65 and has a bevel gear 66 fixed to one end thereof and meshing with the longitudinal drive shaft bevel gear 63. A chain sprocket 67 is fixed to the other end of the transverse drive shaft 64.

Triple chain sprocket sets respectively designated 68, 69 and 70 are respectively rotatably supported on the sleeves 8, 14 and 15 and extend laterally therefrom at the same elevation. A drive chain 71 engages the engine drive chain sprocket 7 and one sprocket of the first sleeve sprocket set 68. A suitable chain tightener device 72 engages the chain 71 to minimize slack. Drive chains respectively designated 73 and 74 are respectively engaged between the sprocket sets 68 and 69 and between the sprocket sets 69 and 70. A drive chain 75 engages between the sprocket set 70 and the sprocket 67 fixed to the transverse drive shaft 64. Thus, the rotation of the drive chain sprocket 7 on the internal combustion engine 6 results in rotation of the front wheel or tire 45.

Horizontally transversely extending wheel axles respectively designated 76, 77 and 78 are journalled in the fork members 16 of the sleeves 8, 14 and 15 and respectively support wheel hubs 79, 80 and 81 with low pressure tires thereon designated 82, 83 and 84 respectively. The wheel axles 76, 77 and 78 each have a chain sprocket 85 secured thereto carrying chains 86 respectively engaging the sprocket sets 68, 69 and 70 whereby the tires 82, 83 and 84 are simultaneously positively driven by the internal combustion engine chain sprocket 7 along with the front tire 45 to propel the vehicle.

A pivot support 87 is fixed to each of the cylindrical sleeves 8, 14 and 15 and a pair of upwardly extending elongated arms 88 and 89 are pivotally secured intermediate upper and lower ends thereof to each of the pivot supports for movement in the plane of the sprocket chains 86. Sprocket idlers 90 are freely rotatably mounted on the respective arm upper ends and engage the chains 86 from the inside upon separation of the arm upper ends. A cam member 91 is fixed to each of the fork members 16 and slidably engage between and against the respective pairs of elongated arms 88 and 89 below the pivot support 87 for urging the sprocket idlers 90 away from each other to maintain chain tightness as the fork member moves upwardly with respect to the sleeves 8, 14 and 15. Suitable helical tension springs 92 are secured at opposite ends thereof to the upper ends of the arms 88 and 89 to aid in urging the sprocket idlers 90 toward each other as the respective fork member 16 moves downwardly and thereby maintain pressure on the cam members 91.

Oppositely extending lateral projections 93 and 94 are rotatably fixed by means of a collar 95 with respect to the steering shaft 33; however, the steering shaft is longitudinally slidable therethrough. A pair of idler pulleys 96 are mounted by means of a bracket 97 to each side of the frame 2 between the steering shaft 33 and the sleeve 15. Idler pulleys 98 and 99 are mounted on each side of the frame between the intermediate sleeves 14 and 15 and an idler pulley 100 is located on each side of the frame between the sleeves 8 and 14. Axle idler pulleys 101 and 102 are mounted on the fork axles 77 and 78 respectively on each side of the frame. Spaced apart anchors 103 and 104 are fixed to the frame on each side thereof adjacent the sleeve 15 and spaced apart anchors 105 and 106 are fixed to the frame on each side thereof adjacent the rear sleeve 8. Cables 107 are fixed to the lateral projections 93 and 94 and extend rearwardly on each side of the frame and engage a pulley of the pair of idler pulleys 96. The cables 107 then extend or loop downwardly into engagement with the fork axle idler pulleys 102 and then upwardly into engagement with the idler pulleys 98 and then terminate in stop members 108 movable between the anchors 103 and 104 but restricted by engagement with the anchors 104 against movement therepast. Helical tension springs 109 are anchored at one end thereof to the anchors 103 and at the other end thereof to the stop members 108 to maintain resilient tension on the cables 107 when the respective stop member 108 is not engaged with the anchor 104.

Cables 110 are also fixed to each of the lateral projections 93 and 94 and engage a pulley of each of the idler pulley pairs 96. The cables 110 then engage the pulleys 99 from which they extend or loop downwardly into engagement with the forked axle idler pulleys 101 and then upwardly into engagement with the idler pulleys 100. The cables 110 terminate in stop members 111 movable between the anchors 105 and 106 but restricted by engagement with the anchors 105 against movement therepast. Additional tension springs 112 are anchored at one end thereof to the respective anchors 106 and at the other end thereof to the stop members 111 to maintain resilient tension on the cables 110. The cables 107 and 110 are of a length so that a turning of the handlebar steering member 28 through a substantial angle will cause the respective stop members 108 and 111 to engage the anchors 104 and 105 on the side of the vehicle opposite the direction of turn and further turning will raise the intermediate tires 83 and 84 out of driving contact with the ground to permit the turning without dragging the intermediate tires laterally. The tension springs 109 and 112 take up the cable slack on the opposite sides of the vehicle and also take up slack produced when the intermediate tires are relatively high with respect to the frame during vehicle operation.

A seat 113 is fixed to the frame to support the operator and suitable foot rests 114 are also secured to the frame and extend laterally therefrom for the convenience of the operator. The vehicle has a maximum seat height which will permit the operator to contact the ground with his feet, if desired. A carrier rack 115 is fixed to the frame immediately behind the seat 113 for carrying a load, for example the carcass of an animal when the vehicle is used for a hunting expedition. A suitable fender or covering boy 116 is provided to protect the operator from becoming entangled in the various chains and gears and also to keep brush and the like away from moving parts.

The vehicle is well suited for use in very rough terrain by virtue of having four substantially independently suspended but simultaneously driven tires in simultaneous driving contact with the ground and/or logs, stones and other obstacles. The tires preferably are of the type having heavy lugs or mud tread thereon. Maneuverability is provided by forcing the intermediate wheels to lift during turning so that side scuffing of the intermediate wheels wil not cause difficulty in maintaining balance or steering. When one of the wheels other than the steering wheel is urged upwardly with respect to the frame, for example when climbing over a log or large stone, air trapped in the respective bag 23 is urged into the bags suspending the remaining non-steering wheels to urge same downwardly into compensating driving contact with the ground rather than permitting a lifting of the remaining non-steering wheels. Likewise, when a depression is met, the respective non-steering wheel is urged quickly downwardly the full extent permitted for seeking driving contact at the bottom. These features, in a balance vehicle of relatively small lateral dimension, permit use thereof in rough, heavily vegetated terrain at relatively high speeds.

It is to be understood that although one form of this invention has been illustrated and described, it is not to be limited to the specific form or arrangement of parts herein described and shown except insofar as such limitations are included in the claims.

What I claim and desire to secure by Letters Patent is:

1. A balance-type vehicle comprising:
   (a) a frame, a steering member mounted on said frame, a ground contacting front wheel and a ground contacting rear wheel, means mounting said front and rear wheels on said frame, means cooperating between said front wheel and said steering member for steering said front wheel in response to turning said steering member,
   (b) an intermediate wheel in normal alignment between said front and rear wheels, means resiliently mounting said intermediate wheel on said frame for normal contact with the ground,
   (c) means cooperating between said steering member and said intermediate wheel mounting means for lifting said intermediate wheel out of contact with the ground when said steering member is turned, and means on said frame for driving said intermediate wheel.

2. The vehicle as set forth in claim 1 including:
   (a) a second intermediate wheel, means resiliently mounting said second intermediate wheel on said frame in normal alignment between said front and rear wheels for normal contact with the ground,
   (b) means cooperating between said steering member and said second intermediate wheel mounting means for lifting said second intermediate wheel out of contact with the ground when said steering member is turned, and means on said frame for driving said second intermediate wheel.

3. In a balance-type vehicle having a prime mover and a frame and a driven wheel:
   (a) a resilient suspension mechanism secured to said frame and having an axle supporting said wheel for movement generally vertically toward and away from said frame,
   (b) a chain sprocket on said axle and rotatably movable with said wheel, a drive chain engaging said sprocket and operably engaged with said prime mover for driving said wheel, said chain extending toward said sprocket from said frame whereby slack is produced in said chain as said wheel is moved toward said frame,
   (c) a pivot support fixed with respect to said frame, a pair of upwardly extending elongated arms pivotally secured intermediate upper and lower ends thereof to said pivot support for pivotal movement generally in the plane of said sprocket, sprocket idlers mounted on said respective arm upper ends and engaging said chain upon separation of said arm upper ends, and
   (d) a cam member fixed with respect to said axle and slidably engaging between and against said respective pairs of elongated arms below said pivot support for urging said sprocket idlers away from each other to maintain chain tightness as said axle moves upwardly with respect to the frame.

4. A balance-type vehicle comprising:
   (a) a frame, a steering member mounted on said frame, a ground contacting front wheel and a ground contacting rear wheel, means mounting said front and rear wheels on said frame, means cooperating between said front wheel and said steering member for steering said front wheel in response to turning said steering member,
   (b) an intermediate wheel, means resiliently mounting said intermediate wheel on said frame between said front and rear wheels for normal contact with the ground,
   (c) means cooperating between said steering member and said intermediate wheel mounting means for lifting said intermediate wheel out of contact with the ground when said steering member is turned, and
   (d) a prime mover mounted on said frame and power transmission means connected between said prime mover and said rear wheel and said intermediate wheel for simultaneously driving said rear and intermediate wheels.

5. The vehicle as set forth in claim 4 wherein:
   (a) said means mounting said rear wheel on said frame is resilient mounting means, and including
   (b) means cooperating between said last-named resilient mounting means and said intermediate wheel mounting means to urge said rear wheel downwardly in response to a force urging said intermediate wheel upwardly and urge said intermediate wheel downwardly in response to a force urging said rear wheel upwardly.

6. A balance-type vehicle comprising:
   (a) a frame, a steering member mounted on said frame, a ground contacting front wheel and a ground contacting rear wheel, means mounting said front and rear wheels on said frame, means cooperating between said front wheel and said steering member for steering said front wheel in response to turning said steering member,
   (b) an intermediate wheel, means resiliently mounting said intermediate wheel on said frame between said front and rear wheels for normal contact with the ground,
   (c) means cooperating between said steering member and said intermediate wheel mounting means for lifting said intermediate wheel out of contact with the ground when said steering member is turned, (d) said means cooperating between said steering member and said intermediate wheel mounting means including a cable disposed on each side of said vehicle and having one end secured to said steering member for movement in response to the turning of said steering member, (e) guide means secured to said frame and guiding said cable into engagement with said intermediate wheel mounting means in a direction for raising same upon tensioning said cable, (f) said cable terminating at the other end thereof in a stop member, first and second spaced apart anchor members fixed to said frame, said stop member being movable between said anchor members but restricted by engagement with said first anchor member against movement therepast, and (g) a helical tension spring anchored at one end thereof to said second anchor member and at the other end thereof to said stop member for maintaining resilient tension on said cable insufficient to raise said intermediate wheel when said stop member is out of engagement with said first anchor member.

References Cited by the Examiner

UNITED STATES PATENTS

| | | | |
|---|---|---|---|
| 561,710 | 6/1896 | Hicks | 280—239 |
| 638,374 | 12/1899 | Aronstein | 267—65 |
| 1,413,352 | 4/1922 | Peters | 280—284 |
| 2,698,759 | 1/1955 | Ronning | 280—104.5 |
| 2,821,949 | 2/1958 | Uyehara | 180—23 X |
| 2,913,255 | 11/1959 | Courtney et al. | 180—33 X |
| 2,925,873 | 2/1960 | Laporte | 280—5 |
| 3,055,677 | 9/1962 | Smith | 280—104.5 |
| 3,083,038 | 3/1963 | Moulton | 280—276 |
| 3,118,514 | 1/1964 | Bowman | 180—31 |
| 3,158,220 | 11/1964 | Griffith | 180—30 X |

FOREIGN PATENTS

| | | |
|---|---|---|
| 738,018 | 10/1932 | France. |
| 1,203,898 | 4/1959 | France. |
| 494,013 | 10/1938 | Great Britain. |
| 507,709 | 7/1955 | Italy. |

KENNETH H. BETTS, *Primary Examiner.*